E. BONSNESS.
SIEVE ADJUSTER FOR SIEVE SHOES.
APPLICATION FILED OCT. 30, 1911.
1,040,129.
Patented Oct. 1, 1912.
3 SHEETS—SHEET 1.
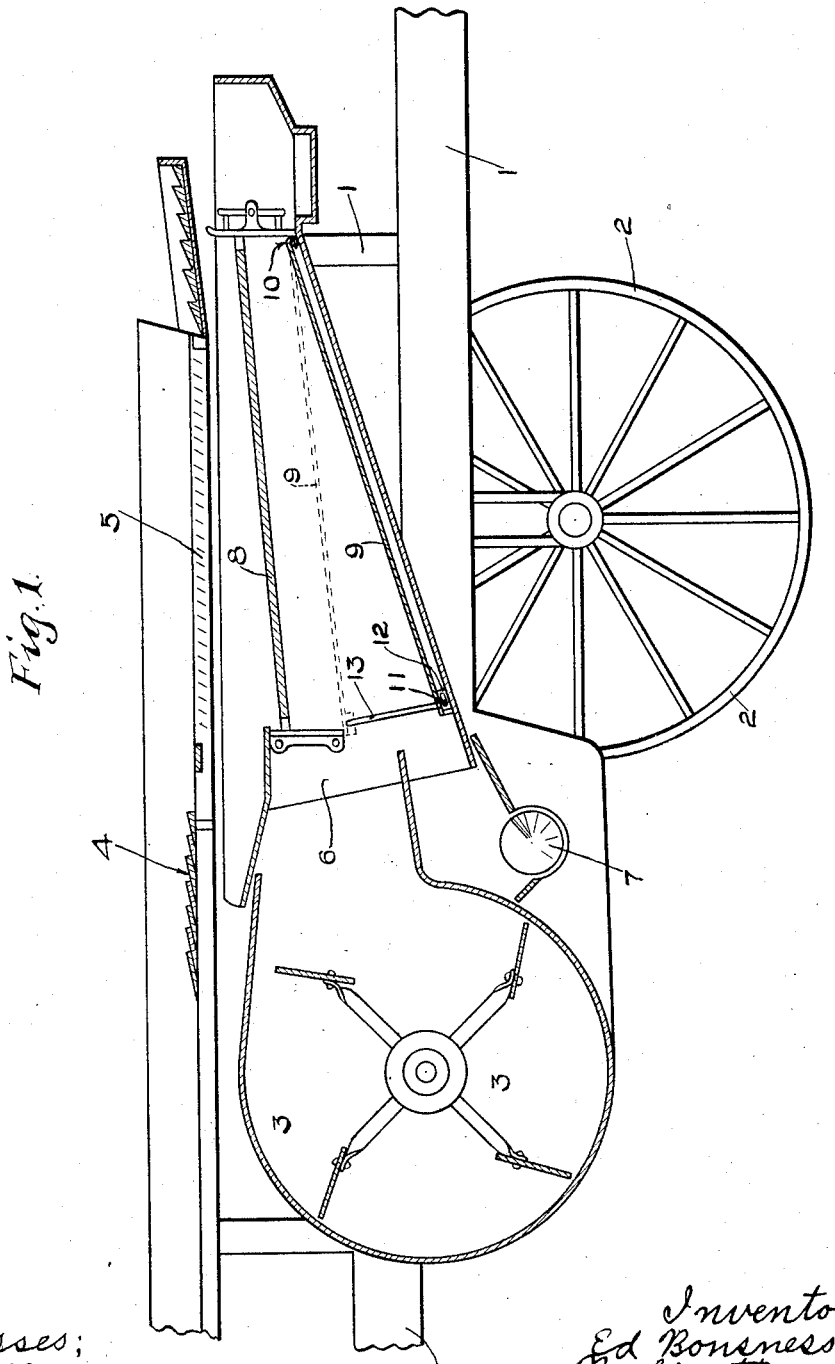
Witnesses;
H. A. Hillgren
Geo. Knutson
Inventor;
Ed Bonsness.
By his attorneys;

E. BONSNESS.
SIEVE ADJUSTER FOR SIEVE SHOES.
APPLICATION FILED OCT. 30, 1911.
1,040,129.
Patented Oct. 1, 1912.
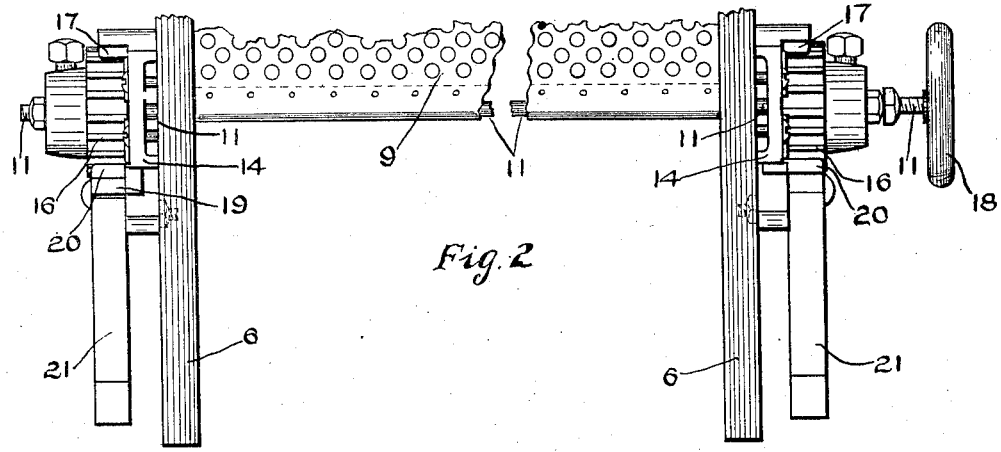
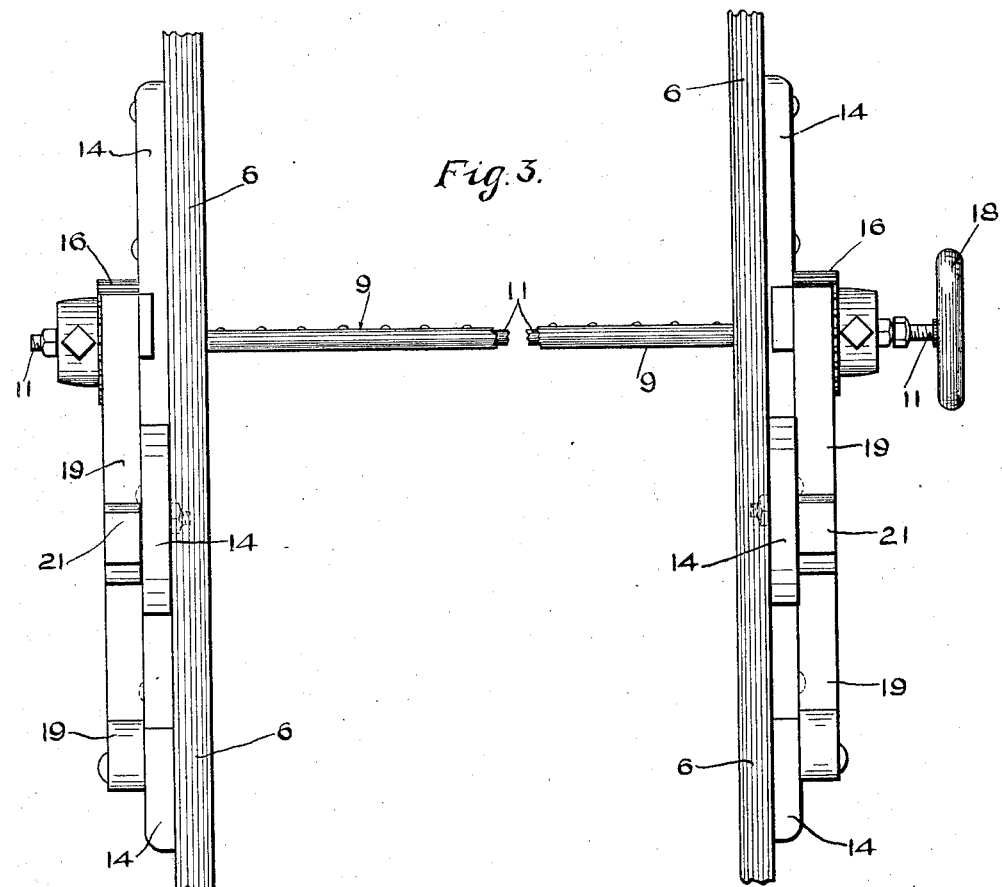

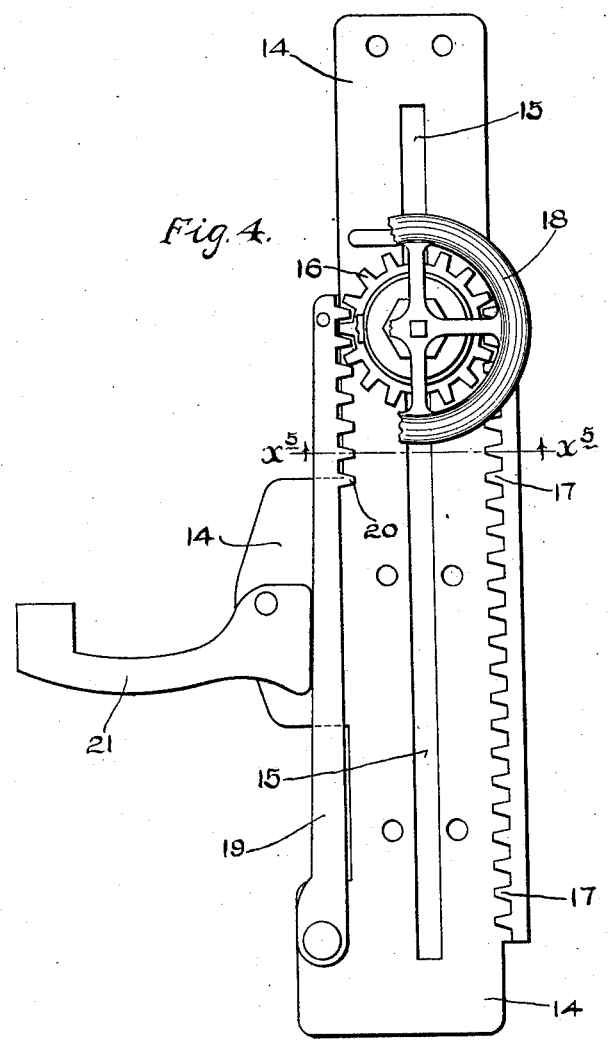
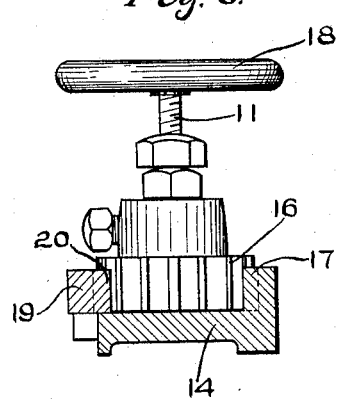

UNITED STATES PATENT OFFICE.

EDWARD BONSNESS, OF MARTELL, WISCONSIN.

SIEVE-ADJUSTER FOR SIEVE-SHOES.

1,040,129.  Specification of Letters Patent.  Patented Oct. 1, 1912.

Application filed October 30, 1911. Serial No. 657,615.

*To all whom it may concern:*

Be it known that I, EDWARD BONSNESS, a citizen of the United States, residing at Martell, in the county of Pierce and State of Wisconsin, have invented certain new and useful Improvements in Sieve-Adjusters for Sieve-Shoes; and I do hereby declare the following to be a full, clear, and exact description of the invention, such as will enable others skilled in the art to which it appertains to make and use the same.

My invention relates to threshing machines or grain separators and is particularly directed to the adjustment or arrangement of sieves adapting the same for the separation of flax.

To the above ends, the invention consists of the novel devices and combination of devices hereinafter described and defined in the claims.

In a threshing machine or separator, adjustable sieves made up of pivotally adjustable supplemental slats are now quite generally employed and these sieves are highly efficient for the separation of wheat, oats, and various other seeds generally designated as "succotash." It has been found, however, that they are not efficient for the separation of flax in a threshing machine, and it has been found necessary to remove the adjustable slat sieves and substitute therefor an ordinary zins flax sieve. This interchanging of sieves involves considerable labor and necessitates the interruption of the operation of the threshing machine.

In accordance with my invention, I place an ordinary zins flax sieve under the adjustable slat sieve and adjustably mount the same so that in an instant the said flax sieve may be rendered operative or entirely thrown out of action. This, as is evident, adapts the sieve mechanism of the threshing machine to be instantly adjusted for any kind of work without having to interrupt the action of the threshing machine or stop the same.

The invention in its preferred form, is illustrated in the accompanying drawings wherein like characters indicate like parts throughout the several views.

Referring to the drawings,—Figure 1 is a vertical section showing the sieve structures and certain coöperative parts of the threshing machine, illustrating my invention incorporated therein; Fig. 2 is a top view of the improved adjusting device attached to a portion of the sieve shoe and the flax sieve; Fig. 3 is a front end elevation of the parts shown in Fig. 2, some parts being broken away; Fig. 4 is a view in side elevation showing the flax sieve adjusting device removed from the shoe, with some parts broken away; and, Fig. 5 is a transverse horizontal section taken on the line $x^5\ x^5$ of Fig. 4.

Of the parts of the threshing machine or separator, the numeral 1 indicates the frame or case, the numeral 2 the rear wheel, the numeral 3 the fan, the numeral 4 the straw rack, the numeral 5 a chaffer, and the numeral 6 a vibratory sieve shoe which latter has an inclined imperforated bottom delivering to a transverse grain conveyer 7, all of which parts are of standard or of suitable construction.

The shoe 6 is vibrated longitudinally of the machine by the usual or any suitable means, not shown, and it carries the upper adjustable slat sieve which is preferably of the type known to the trade as the "Closz and Howard adjustable sieve," and which, in Fig. 1 is indicated as an entirety by the numeral 8.

The lower or flax sieve 9 is of the type of an ordinary perforated zins sieve. At its receiving end, the flax sieve 9 is fulcrumed at 10 on the bottom of the shoe 6, and its delivery end is adjustably secured to the shoe 6 by the improved adjusting device. Referring to the improved adjusting device for the flax sieve 9, the numeral 11 indicates a horizontally extended shaft loosely and rotatively mounted in bearings 12 secured to the underside and at the delivery end of the shoe 6. The ends of the shaft 11 extend beyond the side of the flax sieve 9 and work within vertically extended slots 13 formed in the sides of the shoe 6. Secured to the outer faces of the sides of the shoe 6 are castings 14 provided with vertically and longitudinally extended slots 15. These slots 15 register with the slots 13 of the shoe 6 and the projecting ends of the shaft 11 also work therethrough. At each end of the projecting shaft 11 is rigidly secured, by set screws or otherwise, pinions 16 which mesh with vertically extended racks 17 integrally formed on the casting 14 and extend parallel to the slots 15. The shaft 11 is rotated by means of a hand wheel 18 rigidly secured on one end thereof.

As is evident, by rotating the hand wheel 18, the pinions 16 may be moved either up or down on the racks 17, thereby carrying the delivery end of the flax sieve 9 into different operative positions or into an inoperative position.

For locking the pinions 16 against rotation, and in different set positions, with respect to the rack 17, vertically extended lock levers 19 are pivotally secured at their lower ends to the castings 14, and their upper ends are provided with a multiplicity of teeth 20 which are adapted to mesh with the teeth of the pinion 16. These lock levers 19 are held in operative positions by means of gravity actuated lock dogs 21 pivotally attached to projecting lugs on the castings 14.

When the threshing machine is not used for separating flax, the flax sieve 9 is lowered into a position onto the bottom of the shoe 6, as shown in full lines in Fig. 1.

What I claim is:

The combination with a sieve shoe, of a sieve mounted in said shoe with its receiving end fulcrumed thereto, a shaft supporting the delivery end of said sieve, a pinion secured to said shaft, a rack secured to said shoe and with which said pinion meshes, means for rotating said pinion, a lock lever pivotally attached to said shoe and provided with a multiplicity of teeth arranged to be moved into and out of engagement with the teeth of said pinion, and means for locking said lock lever in an operative position.

In testimony whereof I affix my signature in presence of two witnesses.

EDWARD BONSNESS.

Witnesses:
GUSTAV A. THOMPSON,
ESTHER M. THOMPSON.

---

Copies of this patent may be obtained for five cents each, by addressing the "Commissioner of Patents, Washington, D. C."